United States Patent [19]

Ogawa

[11] Patent Number: 4,988,933
[45] Date of Patent: Jan. 29, 1991

[54] HEAD DRIVING CIRCUIT

[75] Inventor: Tomihisa Ogawa, Ome, Japan

[73] Assignee: Kabushiki Kaisha Toshiba, Kanagawa, Japan

[21] Appl. No.: 353,943

[22] Filed: May 19, 1989

[30] Foreign Application Priority Data

May 31, 1988 [JP] Japan ................ 63-133625

[51] Int. Cl.$^5$ ............................. G05B 13/00
[52] U.S. Cl. .................... 318/561; 360/78.05; 360/78.04; 360/78.06; 360/78.07
[58] Field of Search ............... 318/561; 360/78.05, 360/78.04, 78.06, 78.07

[56] References Cited

U.S. PATENT DOCUMENTS

Re. 32,075  1/1986  Harrison et al. ............. 360/77
4,535,372  8/1985  Yeakley ...................... 360/77.05

FOREIGN PATENT DOCUMENTS 265287   4/1986   European Pat. Off. .
249020  12/1987   European Pat. Off. .
260138   3/1988   European Pat. Off. .

OTHER PUBLICATIONS

Palmer, Voltage Boost Circuit for Servo Power Amplifier, IBM Technical Disclosure Bulletin, vol. 17, No. 9, pp. 2752-2753 (2/75).
Peripheral Circuit Technology for 800MB Disk Storage Drive; by Shuichi Takanami, Hiroshi Naranishi, and Ryoichi Arai (1979).
Commander et al., "Servo Design for an Eight-Inch Disk File," IBM Disk Storage Technology, pp. 89-97, Feb. 1980.

Primary Examiner—William M. Shoop, Jr.
Assistant Examiner—Saul M. Bergmann
Attorney, Agent, or Firm—Finnegan, Henderson, Farabow, Garrett, and Dunner

[57] ABSTRACT

The invention comprises a voice coil motor for moving a head for reading information from or writing information to a disk, a driving circuit for supplying current to the voice coil motor in response to a first control signal and for changing the gain of the driving circuit in response to a second control signal. The gain of the driving circuit is increased during a moving control mode (i.e. a seek mode) and decreased during a position control mode (i.e. a track-following mode).

7 Claims, 2 Drawing Sheets

HEAD DRIVING CIRCUIT

FIELD OF THE INVENTION AND RELATED ART STATEMENT

The present invention relates to a head driving circuit used for a magnetic disk unit or the like.

In general, an information processing apparatus, such as a personal computer, employs an information recording and reproducing unit, such as a magnetic disk unit or an optical disk unit, as an external storage unit.

For instance, the magnetic disk unit has a head positioning mechanism which serves to position a magnetic head loaded on a carriage assembly at a given position on a recording surface of a magnetic disk when a command is issued from a personal computer.

The moving system of such a carriage assembly can employ a swing arm type mechanism or a linear type mechanism. The driving system used in the carriage assembly may employ a voice coil motor or a stepping motor, for example.

A voice coil motor driving circuit for the voice coil motor mainly operates in either of two modes to position the magnetic head. The first mode is a moving (speed) control mode, often known as "seek mode" in the art, and the second mode is a track-following (position) control mode.

The foregoing conventional voice coil motor driving circuit, must supply a relatively large exciting current to an exciting coil in the moving control mode. Therefore, the signal (ACTDRV) for driving the voice coil motor has a relatively large signal voltage waveform amplitude.

On the other hand, in the track-following control mode, the voice coil motor driving circuit supplies an exciting current to the exciting coil which is much smaller than that required in the moving control mode. Therefore, in this case, the signal (ACTDRV) for driving the voice coil motor has a relatively small signal voltage waveform amplitude.

Furthermore, conventional voice coil motor driving circuits are required to achieve good accuracy, especially in the track-following control mode.

However, various conditions may cause variations in some elements, such as resistors, used in the voice coil motor driving circuit. In this case, the dead band and the gain are made less stable, with the results that the magnetic head loaded on the carriage assembly is positioned less accurately. The ultimate result may be the degradation of stable and reliable recording or reproducing of information on a recording medium.

OBJECT AND SUMMARY OF THE INVENTION

The present invention is designed to overcome the foregoing disadvantages, and it is an object of the invention to provide a head driving circuit which can stably and reliably record or reproduce information on a recording medium.

To achieve the object, the invention comprises a voice coil motor for moving a head for reading information from a disk or writing it thereon, a driving means for supplying current to the voice coil motor in response to a first control signal, and a gain control means for changing the gain of the driving means in response to a second control signal.

According to the head driving circuit of the invention, the gain control means can switch the gain of the driving means in a stepwise manner, thereby stably positioning the head. It can stably and reliably record information on a recording medium or reproduce it therefrom. Moreover, since this head driving circuit can avoid the adverse effect resulting from variations of elements, such as resistors or variation of the input offset voltage of a power operational amplifier, it can utilize less accurate elements, resulting in a lower overall cost.

DETAILED DESCRIPTION OF THE PREFERRED EMBODIMENT

Hereafter, one embodiment of the invention will be described in detail with reference to the drawings.

Figure 1:
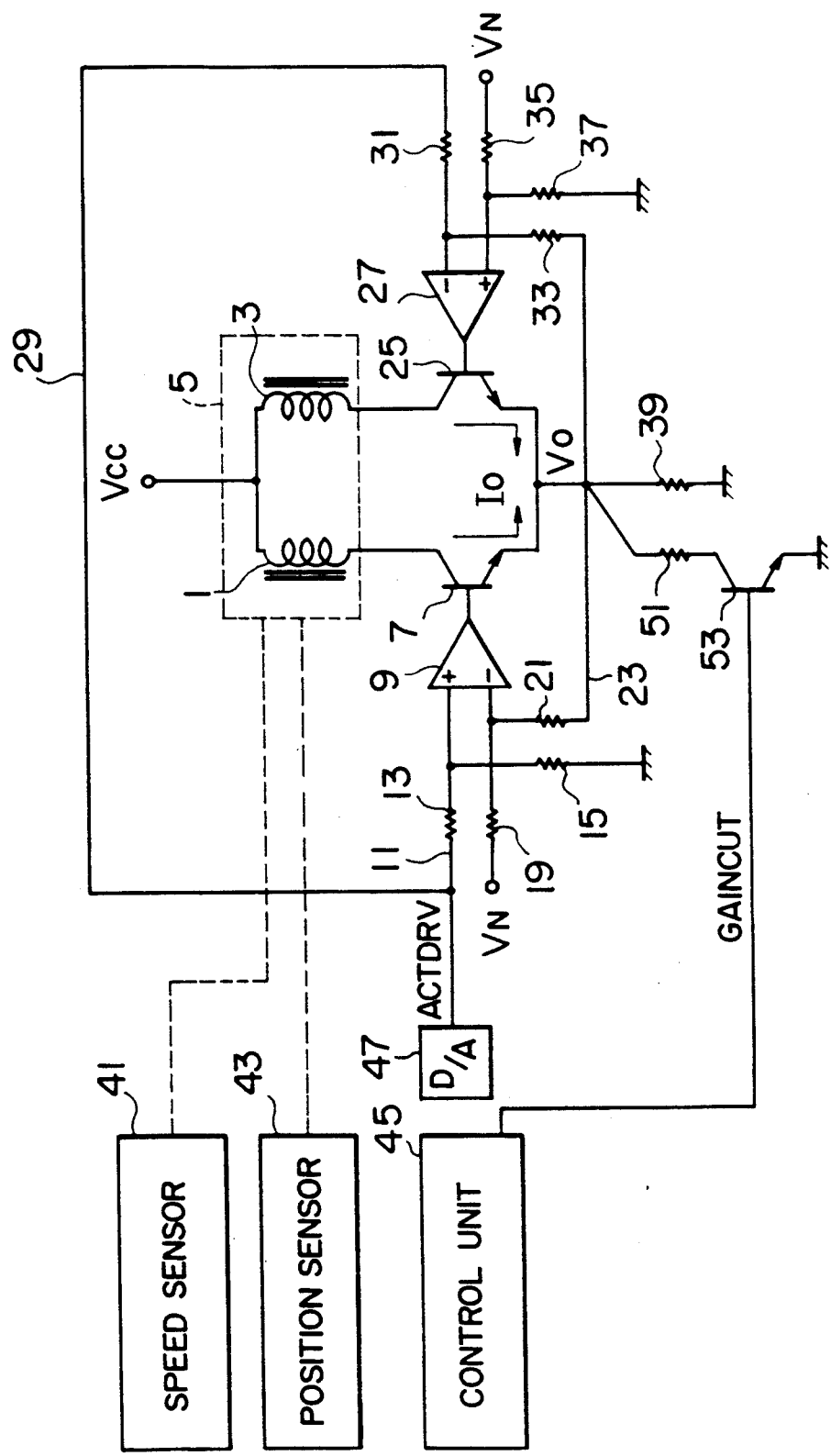
FIG. 1 is a circuit diagram showing a voice coil motor driving circuit of one embodiment of the present invention.

FIG. 1 shows one embodiment of a voice coil motor driving circuit in which the invention is applied to a magnetic disk unit.

As shown, the voice coil motor driving circuit comprises a voice coil motor 5 equipped with a center tap containing exciting coils 1 and 3.

The exciting coil 1 is connected to the collector of the transistor 7 for controlling the amount of the exciting current $I_0$ supplied from a reference power source $V_{cc}$. The base of the transistor 7 is connected to a power operational amplifier 9.

The positive input terminal (+) of the power operational amplifier 9 is connected to a resistor 13 in series with a line 11 for transferring a positive polarity signal of the signal ACTDRV to be supplied from a control unit to be described later. The value of the resistor 13 affects the gain of the voice coil motor driving circuit. The positive input terminal (+) is also connected to a resistor 15 which also affects the gain of the voice coil motor driving circuit.

The negative input terminal (−) is connected to a built-in reference power source VN through a resistor 19. Resistor 19 additionally affects the gain of the voice coil motor driving circuit. The negative input terminal (−) is also connected to a resistor 21 which affects the gain of the voice coil motor driving circuit. Resistor 21 is connected to a line 23.

The resistors 13 and 19 respectively may be assumed to have a resistance value of r11, and the resistors 15 and 21 respectively may be assumed to have a resistance value of r12.

The exciting coil 3 is connected to the collector of the transistor 25 for controlling the amount of the exciting current $I_0$ to be supplied from the reference power source $V_{cc}$ to the exciting coil 3. The base of the transistor 25 is connected to a power operational amplifier 27.

The negative input terminal (−) of the power operational amplifier 27 is connected to a resistor 31 which affects the gain of the voice coil motor driving circuit. Line 29 transfers to the signal ACTDRV to the Resistor 31. The negative input terminal (−) of the power operational amplifier 27 is connected to a resistor 33.

The positive input terminal (+) is connected to a built-in reference power source VN through a resistor 35 which affects the gain of the voice coil motor driving circuit. The positive input terminal (+) is also connected to a resistor 37 which affects the gain of the voice coil motor driving circuit.

The resistors 31 and 35 respectively may be assumed to have a resistance value of r21 and the resistors 33 and 37 respectively may be assumed to have a resistance value of r22.

Resistor 39 whose resistance is R is connected to each emitter of the transistors 7 and 25 and the line 23.

One end of the resistor 39 is connected in parallel with a resistor 51 whose resistance is $R_A$. The other end of the resistor 51 is connected to the ground via transistor 53. A control unit 45 supplies a signal GAINCUT to the base of the transistor 53 such that the transistor 53 is conductive in case of a high-level GAINCUT signal and is not conductive in case of a low-level GAINCUT signal.

A speed sensor 41 and a position sensor 43 respectively detect the speed and the position of the head (not shown) and send them to the control unit 45. In response to these signals, the control unit 45 produces the signal ACTDRV for driving the head and sends it to a D/A converter 47. The signal GAINCUT is at a low level in a track-following control mode and at a high level in a moving control mode.

The voice coil motor driving circuit having the foregoing arrangement operates as follows.

The D/A converter 47 applies a positive voltage signal ACTDRV to the positive input terminal (+) of the power operational amplifier 9. Next, the power operational amplifier 9 amplifies the difference between the voltage of the signal ACTDRV and the voltage applied at the negative input terminal (−) by the built-in reference power source VN and outputs the result to the transistor 7. The transistor 7 controls the amount of the exciting current $I_0$ supplied from the reference power source $V_{cc}$ to the exciting coil 1 based upon the magnitude of the signal voltage applied to the base of the transistor 7.

On the other hand, when a negative voltage signal ACTDRV is applied at the negative input terminal (−) of the power operational amplifier 27 through the line 29, the power operational amplifier 27 amplifies the difference between the voltage of the signal ACTDRV and the voltage applied from the built-in reference power source VN to the positive input terminal (+). Then, the transistor 25 controls the amount of the exciting current $I_0$ supplied from the reference power source $V_{cc}$ to the exciting coil 3 based upon the magnitude of the signal voltage applied to the base of the transistor 25.

Figure 2:
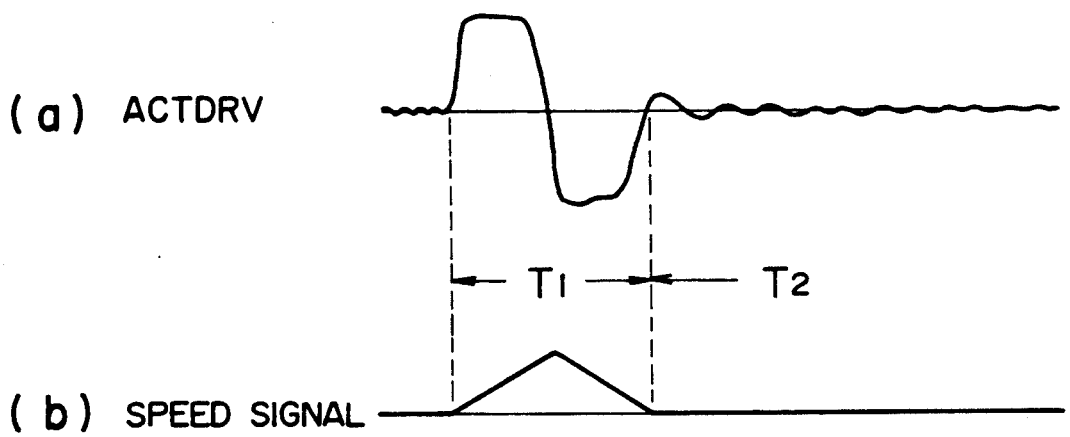
FIG. 2 is a representation of various signals produced in the circuit shown in FIG. 1.
Figure 1:
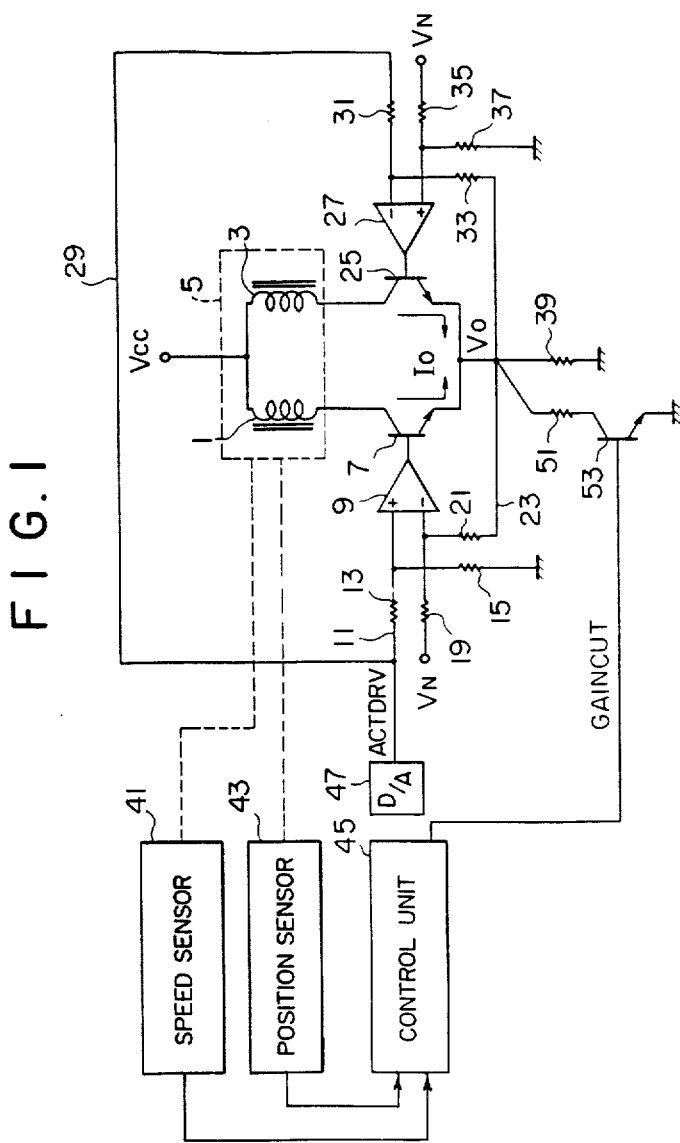

FIGS. 2(a) and (b) are waveform diagrams showing the signal ACTDRV and the head speed signal sent to the control unit 45. T2 thereafter denotes a period of time when the circuit is in a track following control mode. T2 thereafter denotes a period of time when the circuit is in a track following control mode. As shown in FIGS. 2(a) and (b), in the moving control mode, the signal ACTDRV has a large absolute value, but a small value in the position control mode.

As shown in FIG. 2(b), the head speed is controlled in such that it increases during the first half of the period T1 and decreases during the latter half and is constant during the period T2.

As set forth above, the control unit 45 provides the signal GAINCUT at a low level in the track-following control mode and at a high level in the moving control mode.

Assuming that the signal GAINCUT is held at a low level and the transistor 53 is therefore in an off state, the gain G of the voice coil motor driving circuit is:

G OFF = r12/r11/R or
G OFF = r22/r21/R

Assuming that the signal GAINCUT stays at is held at a high level and the transistor 53 therefore is in an on state, the gain G of the voice coil motor driving circuit is:

G ON = r12/r11/RG or
G ON = r22/r21/RG (where RG is value of the resistor 51) and R and is obtained by the equation; RG = (RA × R)/(R + RA)).

Consequently, the gain G of the voice coil motor driving circuit has the relation G OFF < G ON.

As set forth above, the present embodiment is designed to connect the resistors 51 and 39 in parallel and allow the transistor 53 to switch the gain G from a first value the track-following control mode to a second value in the moving control mode or vice versa.

In the moving control mode, therefore, by increasing the gain G, it is possible to saturate the voice coil motor driving circuit. On the other hand, in the track-following control mode, by decreasing the gain G, it is possible to improve the operation accuracy of the voice coil motor driving circuit with minimal current.

Therefore, irrespective of whether the moving control mode or the track-following control mode is selected, the dynamic range of the signal ACTDRV can be adjusted to avoid any adverse effects resulting from variations in the resistance value r11 or r12 of each resistor or from variations in these input offset voltage of each power operational amplifier 9 or 27.

This embodiment describes the magnetic disk unit to which the present invention is applied, but it should be understood that the invention may be applied to another information recording and reproducing apparatus, such as an optical disk unit.

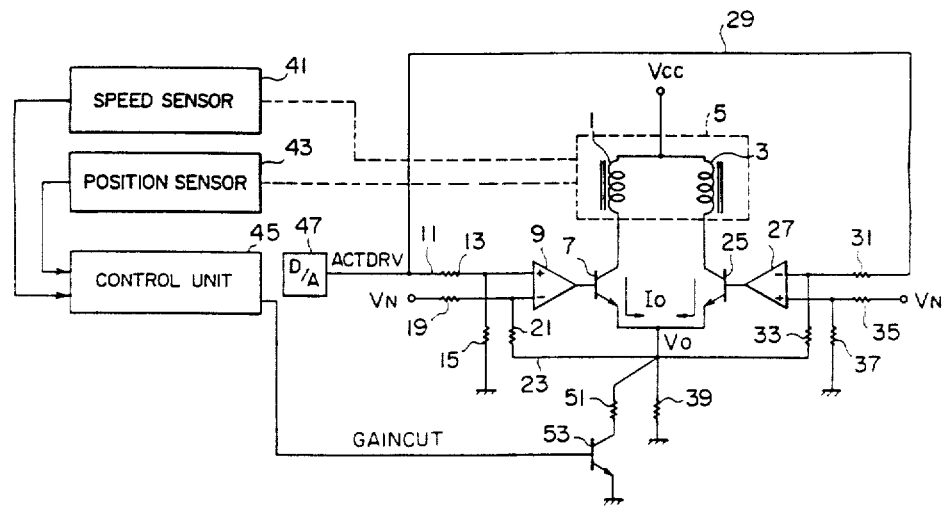

What is claimed is:

1. A head driving apparatus in a data storage apparatus, the data storage apparatus including a recording medium and a head disposed adjacent to the recording medium, comprising:

a voice coil motor for moving the head to a plurality of predetermined positions adjacent to the recording medium, driving means for supplying an exciting current to said voice coil motor in response to a drive signal and a gain selection signal, gain control means for producing said gain selection signal, said gain selection signal corresponding to a high gain in a seek mode and corresponding to a low gain in a track-following mode.

2. The head driving apparatus according to claim 1, wherein said driving means comprises:

an operation amplifier having a first terminal for receiving said drive signal and a second terminal for receiving a reference voltage and an output;

a plurality of resistors for determining the gain of said operation amplifier, and a transistor including a base connected to the output of said operation amplifier, a collector connected to said voice coil motor, and an emitter connected to at least one of said plurality of resistors.

3. The head driving apparatus according to claim 1, wherein said recording medium comprises a magnetic disk.

4. The head driving apparatus according to claim 1, wherein said recording medium comprises an optical disk.

5. The head driving apparatus of claim 1, wherein said gain control means comprises a control unit and a digital-to-analog converter.

6. The head driving apparatus of claim 1, further comprising a speed sensing system for sensing the speed of the head connected to the gain control means and a position sensing system for sensing the position of the head connected to the gain control means.

7. The head driving apparatus of claim 2, wherein said driving means further comprises:

a second operational amplifier having a first terminal for receiving said drive signal and a second terminal for receiving a reference voltage and an output;

a plurality of resistors for determining the gain of said operation amplifier, and a transistor including a base connected to the output of said operation amplifier, a collector connected to said voice coil motor, and an emitter connected to at least one of said plurality of decreased during a position control mode (i.e. a track-following mode).

* * * * *

UNITED STATES PATENT AND TRADEMARK OFFICE
CERTIFICATE OF CORRECTION

PATENT NO. : 4,988,933
DATED : January 29, 1991
INVENTOR(S) : Tomihisa Ogawa

It is certified that error appears in the above-identified patent and that said Letters Patent is hereby corrected as shown below:

Claim 7, column 6, lines 9-11, delete "decreased during a position control mode (i.e., a track-following mode)" and insert --resistors--.

Signed and Sealed this

Twentieth Day of April, 1993

*Attest:*

MICHAEL K. KIRK

*Attesting Officer*     *Acting Commissioner of Patents and Trademarks*

UNITED STATES PATENT AND TRADEMARK OFFICE
CERTIFICATE OF CORRECTION

PATENT NO.   : 4,988,933
DATED        : January 29, 1991
INVENTOR(S)  : Tomihisa Ogawa It is certified that error appears in the above-indentified patent and that said Letters Patent is hereby corrected as shown below:

The Title page should be deleted to appear as per attached title page.

In the drawings, Fig. 1 should be deleted to appear as per attached sheet.

Signed and Sealed this

Eighth Day of June, 1993

Attest:

MICHAEL K. KIRK

*Attesting Officer*   Acting Commissioner of Patents and Trademarks

United States Patent [19]

Ogawa

[11] Patent Number: 4,988,933
[45] Date of Patent: Jan. 29, 1991

[54] HEAD DRIVING CIRCUIT

[75] Inventor: Tomihisa Ogawa, Ome, Japan

[73] Assignee: Kabushiki Kaisha Toshiba, Kanagawa, Japan

[21] Appl. No.: 353,943

[22] Filed: May 19, 1989

[30] Foreign Application Priority Data

May 31, 1988 [JP] Japan .................. 63-133625

[51] Int. Cl.⁵ ............................................ G05B 13/00
[52] U.S. Cl. ............................... 318/561; 360/78.05; 360/78.04; 360/78.06; 360/78.07
[58] Field of Search .................. 318/561; 360/78.05, 360/78.04, 78.06, 78.07

[56] References Cited

U.S. PATENT DOCUMENTS

| Re. 32,075 | 1/1986 | Harrison et al. | 360/77 |
| 4,535,372 | 8/1985 | Yeakley | 360/77.05 |

FOREIGN PATENT DOCUMENTS

| 265287 | 4/1986 | European Pat. Off. |
| 249020 | 12/1987 | European Pat. Off. |
| 260138 | 3/1988 | European Pat. Off. |

OTHER PUBLICATIONS

Palmer, Voltage Boost Circuit for Servo Power Amplifier, IBM Technical Disclosure Bulletin, vol. 17, No. 9, pp. 2752-2753 (2/75).

Peripheral Circuit Technology for 800MB Disk Storage Drive; by Shuichi Takanami, Hiroshi Naranishi, and Ryoichi Arai (1979).

Commander et al., "Servo Design for an Eight-Inch Disk File," IBM Disk Storage Technology, pp. 89-97, Feb. 1980.

Primary Examiner—William M. Shoop, Jr.
Assistant Examiner—Saul M. Bergmann
Attorney, Agent, or Firm—Finnegan, Henderson, Farabow, Garrett, and Dunner

[57] ABSTRACT

The invention comprises a voice coil motor for moving a head for reading information from or writing information to a disk, a driving circuit for supplying current to the voice coil motor in response to a first control signal and for changing the gain of the driving circuit in response to a second control signal. The gain of the driving circuit is increased during a moving control mode (i.e. a seek mode) and decreased during a position control mode (i.e. a track-following mode).

7 Claims, 2 Drawing Sheets